United States Patent [19]
Michon et al.

[11] 3,882,531
[45] May 6, 1975

[54] APPARATUS FOR SENSING RADIATION AND PROVIDING ELECTRICAL READ OUT

[75] Inventors: Gerald J. Michon, Waterford; Hubert K. Burke, Scotia, both of N.Y.

[73] Assignee: General Electric Company, Schenectady, N.Y.

[22] Filed: May 29, 1973

[21] Appl. No.: 364,345

[52] U.S. Cl. .................... 357/24; 357/30; 307/304; 357/23; 307/311; 357/41
[51] Int. Cl. ......................... H01l 15/00; H01l 11/14
[58] Field of Search ........ 317/235 N, 235 B, 235 G; 357/24, 23, 30; 307/304, 311

[56] References Cited

UNITED STATES PATENTS

| | | | |
|---|---|---|---|
| 3,623,026 | 11/1971 | Engeler | 340/173 LS |
| 3,676,715 | 7/1972 | Brojdo | 307/304 |
| 3,789,267 | 1/1974 | Krambeck | 317/235 R |

OTHER PUBLICATIONS

Boyle et al., *I.E.E.E. Spectrum,* July 1971, pp. 18–27.
Melen et al., *IEEE Journal of Solid State Circuits,* Feb. 1972, pp. 92–93.

*Primary Examiner*—Martin H. Edlow
*Attorney, Agent, or Firm*—Julius J. Zaskalicky; Joseph T. Cohen; Jerome C. Squillaro

[57] ABSTRACT

In an array of radiation sensing devices each including a pair of closely coupled conductor-insulator-semiconductor cells on a common substrate, each of the devices is addressed in sequence for read out. Read out of a device is accomplished by reducing the amplitudes of the voltages on the cells of the device in sequence to inject charge stored in the cells into the substrate and by sensing such injected charge. The device is reset for the next cycle of operation by reestablishing voltages in sequence on the cells. Means are provided in the bulk of the substrate to collect injected charge to avoid recollection by the cells of the device of such charge which has not had sufficient time to recombine or diffuse in the substrate away from the vicinity of the cells.

5 Claims, 20 Drawing Figures

APPARATUS FOR SENSING RADIATION AND PROVIDING ELECTRICAL READ OUT

The present invention relates in general to apparatus including devices and circuits therefore for sensing radiation and developing electrical signals in accordance therewith. The present invention relates in particular to such apparatus which senses and stores charge produced by electromagnetic radiation flux and which provides an electrical readout of the stored charge.

This application relates to improvements in the apparatus of copending patent application, Ser. No. 264,804, filed June 21, 1972, now U.S. Pat. No. 3,805,062 and assigned to the assignee of this application, which application is incorporated herein by reference. This application is also related to copending application Ser. No. 364,346 filed concurrently herewith and of common assignee.

The radiation sensing apparatus disclosed in the aforementioned patent application comprises a substrate of semiconductor material of one conductivity type having a plurality of storage sites arranged in a plurality of rcws and columns for storage of radiation generated minority carriers therein. Eachc of the storage sites includes a row oriented conductor-insulator-semiconductor capacitive cell and a closely coupled column oriented conductor-insulator-semiconductor capacitive cell. Each of the row-oriented conducting members or plates of a row of sites are connected to a respective row conductor line. Each of the column-oriented conducting members or plates of a column of sites are connected to a respective column conductor line. Switching means are provided for periodically connecting and disconnecting the substrate from ground or point of reference potential. Means are provided for charging the row and column conductor lines to predetermined potentials in relation to the potential of the point of reference potential to establish depletion regions in the substrate underlying each of the first and second conductive plates with the depletion regions underlying adjacent first and second conductive plates being coupled. Selective read out of charge stored in a row of sites is accomplished by changing the potential on the row line to cause flow of charge stored in the row-oriented storage cells thereof into the column-oriented storage cells thereof. The read out of charge stored in column-oriented cells is accomplishd by changing the potential on each of the column lines in sequence to cause injection of carriers stored therein into the substrate in sequence and concurrently disconnecting the substrate from ground or reference potential during each such injection of carriers. Each such injection produces a respective current flow in circuit with the substrate which is sensed across an integrating capacitance which includes the inherent capacitance of the conductor lines and conducting members connected thereto in relation to the substrate. Means are provided for periodically sampling the variation in voltage developed on the integrating capacitance to provide an electrical output varying in time in accordance with the variation in amplitude of the samples.

Reestablishment of storage potential on a column-oriented plate after readout causes previously injected charge carriers which have not had time to recombine or diffuse sufficiently far away from the column-oriented cell to be recollected. Such recollected charge degrades the performance of the array in terms of noise level, image lag of the array, and resolution, as well as limiting the speed at which the device of the array can be scanned. Substantial recollection of the injected charge may be avoided by using substrate semiconductor material of lower resistivity which increases the rate of recombination of the injected carriers. Use of lower resistivity semiconductor material however, increases the dark current or noise level of the video output signal of the array.

The present invention is directed to overcoming problems such as outlined above and, in addition, is directed to increasing the performance of the array in other respects as well.

Accordingly, an object of the present invention is to provide improvements in radiation sensing devices and in radiation sensing apparatus utilizing such devices.

Another object of the present invention is to provide arrays of radiation sensing elements of the kind described above which include very large numbers of sensing elements with minimum degradation of the output signal therefrom.

Another object of the present invention is to provide arrays of radiation sensing elements of a given number of elements which can be operated at higher read out speeds with minimal increase in background noise level thereby.

A further object of the present invention is to provide arrays of radiation sensing elements of the kind described above of higher resolution capability than heretofore possible.

In accordance with the present invention, means are provided in an array to avoid recollection by the cells of the device of injected charge which has not had sufficient time to recombine or diffuse in the substrate away from the vicinity of the cells. In an illustrative embodiment such means includes a region of opposite conductivity in the bulk of the substrate spaced from the cells and adjacent to one of the cells. The PN junction formed by the region of opposite conductivity type and the substrate is reversely biased. Preferably the region of opposite conductivity is closely spaced to the cells of devices from which injection into the substrate occurs to rapidly remove injected charge from the substrate.

The novel features which are believed to be characteristic of the present invention are set forth with particularity in the appended claims. The invention itself, both as to its organization and method of operation, together with further objects and advantages thereof may best be understood by reference to the following description taken in connection with the accompanying drawings wherein:

Figures 1A, 1B, 1C:
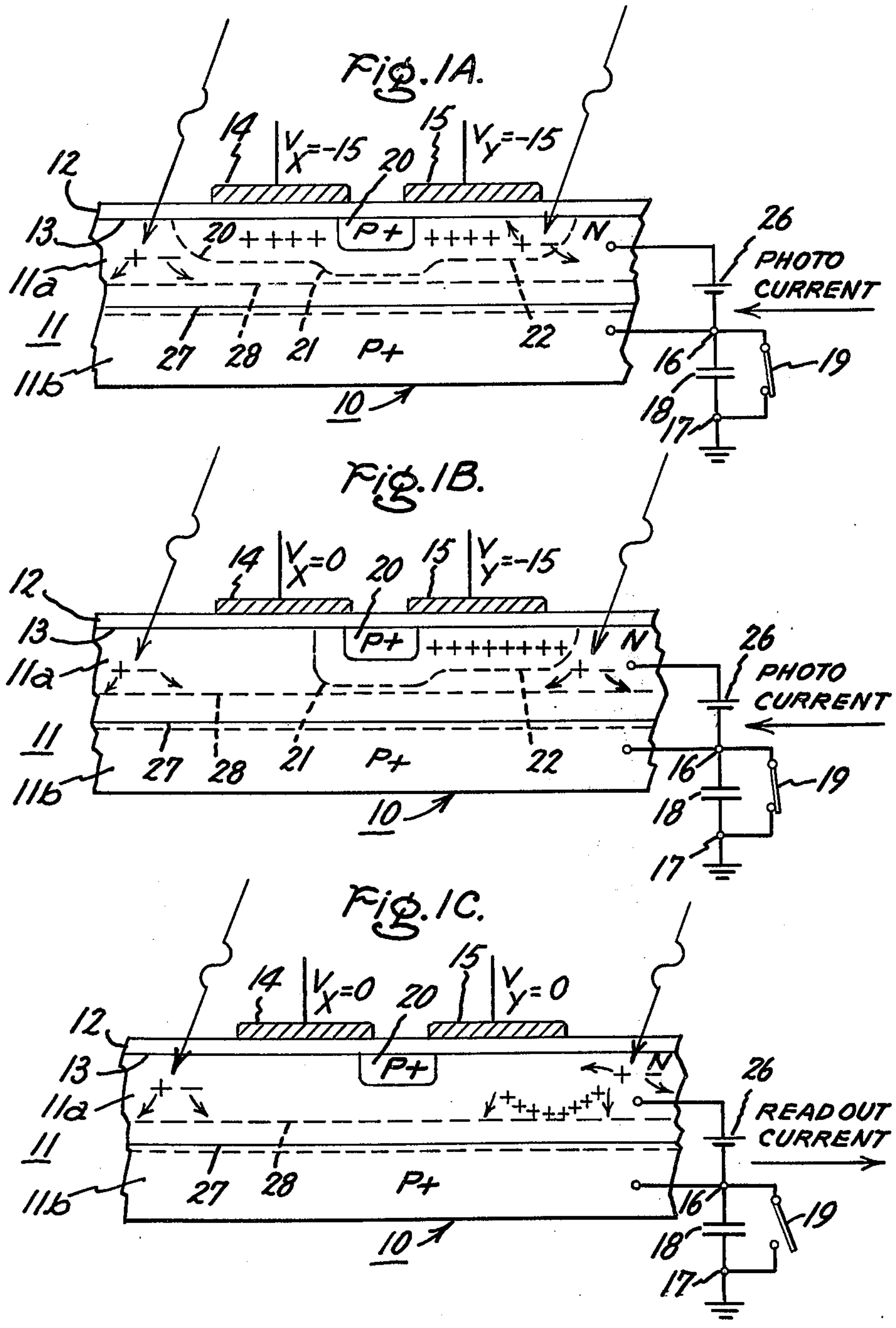
FIGS. 1A–1C show diagrams of devices of conductor-insulator-semiconductor cells embodying the present invention and of the kind incorporated in the radiation sensing array of FIG. 2, illustrating various stages in the operation thereof.

Reference is now made to FIGS. 1A, 1B and 1C which show a pair of coupled sensing cells particularly suitable for operation in two dimensional arrays. FIG. 1A shows a device 10 including a substrate 11 of semiconductor material having a high resistivity layer 11*a* formed on a low resistivity base layer to provide a PN junction in the bulk of the substrate. Also shown is insulating member 12 overlying the major surface 13 of the substrate, and a pair of conductive members or plates 14 and 15 overlying the insulating member. Plate 14 is adapted to be connected to a row conductor line of an array consisting of rows and columns of radiation sensing devices. Plate 15 is adapted to be connected to a column conductor line of the array. Integrating capacitor 18 is connected between terminal 16 of layer 11*b* and ground terminal 17. This capacitor represents the capacitance of the plates 14 and 15 with respect to the substrate as well as intentionally added capacitance. A reset switch 19 is connected across terminals 16 and 17. Plates 14 and 15 are closely spaced and the substrate underlying the space between the plates is provided with a P-type conductivity region 20. The plate 14 and plate 15 are connected to operating potential points on a source (not shown) of operating voltage to provide the indicated negative potentials with respect to ground, i.e. $V_x = -15$ volts and $V_y = -15$ volts. Layer 11*a* of the substrate is connected to the positive terminal of a source 26 of d-c potential, the negative terminal of which is connected to the layer 11*b* of the substrate thereby reversely biasing the PN junction 27 as indicated by formation of the depletion region 28 in the substrate. The P-type layer 11*b* is located close to the depletion region 22 but not so close as to cause charge collected under electrode 15 to be removed by the P-type layer 11*b* during normal operation of electrode 15 in its charge storage mode. However, the depletion region 28 can contact the region 22. Accordingly, when electrode 15 is operated so as to inject charge, the charge carriers move to the depletion region associated with the PN junction 27 and are swept out of the layer 11*a*.

The connection to column oriented plate 15, the ground terminal 17, and the substrate terminal 16 are referred to respectively as first, second and third terminals, and, in addition, the connection to the row oriented plate 14 is referred to as the fourth terminal. The storage potentials applied to the column oriented plate 15 and to the row oriented plate 14 are referred to, respectively, as first and fourth potentials. The reference or ground potential is referred to as the second potential. The injection potential for the column oriented plate 15 is referred to as the third potential.

When potentials of appropriate polarity with respect to the substrate and appropriate magnitude, for example the −15 volts indicated in FIG. 1A, are applied to the plates 14 and 15, a pair of depletion regions or portions 21 and 22 are formed thereunder which are connected together by the high conductivity P-type region 20 which also has a depletion region 23 associated with it. Accordingly, charge stored in one of the depletion regions under either of the plates 14 and 15 may readily flow to the other depletion region through the P-type conductivity region 20. Radiation flux entering the depletion regions from the front or major face of the substrate causes the generation of minority carriers which are stored at the surface of the depletion regions. This condition is indicated by current flow into the substrate as charge accumulates in the surface portion of the depletion regions and corresponds to conduction of electron charge in the external potential applying circuits between the plates and the substrate. FIG. 1B shows the condition of the device when the voltage on plate 14 is set at zero to collapse the depletion region 21 thereof and cause the charge that was stored therein to flow or transfer into the inversion layer in region 22 underlying the plate 15. To read out or sense the charge that has been stored in the inversion layer, potential on the plate 15 is collapsed or reduced in magnitude to a suitable value, such as zero, after the reset switch 19 connected across the integrating capacitor 18 has been opened as shown in FIG. 1C. Such action causes the carriers stored in the inversion layer to be injected into and produce a current flow out of the substrate corresponding to the charge stored in the depletion region 22 and injected into the substrate. The injection of minority carriers is indicated by the distribution of positive charge throughout the substrate 11. Such injection causes a neutralizing negative charge to flow into the substrate, i.e. a conventional current to flow out of the substrate. Such current flows from the substrate 11 into the capacitor 18 which becomes charged to a value dependent on the injected charge. The minority carriers injected into the substrate diffuse away from the region into which they were injected or recombine therein. In accordance with the present invention, the reversely biased PN junction 27 having a depletion region 28 extending into the layer 11*a* adjacent to the charge storage regions in the layer 11*a* facilitates removal of the injected carriers. The charge carriers which diffuse to the depletion region are swept out of the layer 11*a* and recollection is avoided. The potential on plate 15 is then returned to its original value prior to closing of the reset switch 19 and subsequent to the time during which the injected minority carriers have disappeared from the region 22.

Samples may be taken of the voltage on the integrating capacitor resulting from successive cycles of operation of the cell to provide a video signal which represents the integrated value of radiation falling on the cell in successive cycles of operation. Thus, spurious signals produced in the video output due to the drive voltages applied to the cell are largely eliminated. In the case of an array, charge contained in the stray capacitance of the conductors connected to the plates of the device being read out is also included in current flowing into the integrating capacitance. This component of current can be quite large in relation to the current flow in response to injection of the charge. However, as this component of current is not affected by storage of charge in the device, it is completely cancelled by reestablishment of storage potential on the device. Also, in arrays, variations in the cell capacitance are eliminated as long as the first and third potential levels do not vary in the scanning of the array. While in the example the third potential applied to the plate 14 was ground or identical to the second potential, it should be readily apparent that the third potential could by any potential between the first and second potentials.

Figure 2:
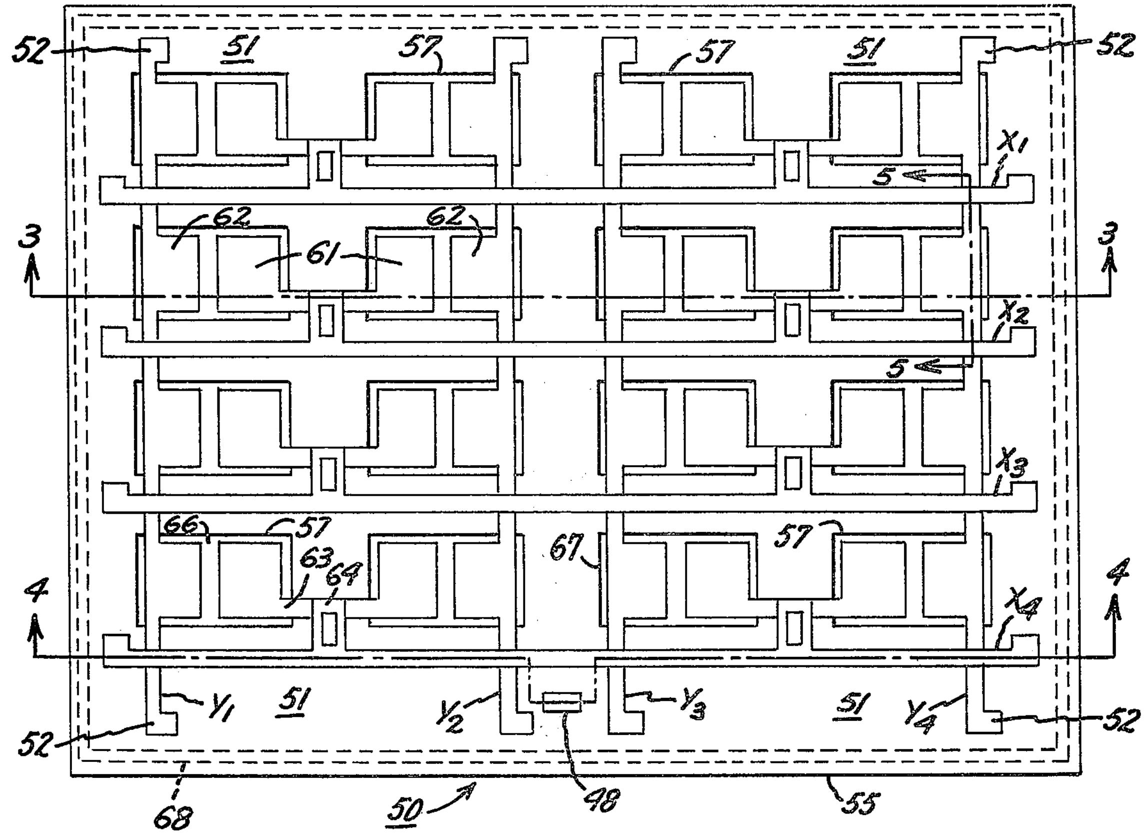
FIG. 2 is a plan view of an array or assembly of a plurality of radiation responsive devices such as shown in FIGS. 1A–1C formed on a common semiconductor substrate.

Reference is now made to FIGS. 2, 3, 4 and 5 which show an image sensing array 50 of radiation sensing devices 51, such as device 10 described in FIGS. 1A, 1B and 1C, arranged in four rows and columns. The array includes four row conductor lines, each connecting the row-oriented plates of a respective row of devices, and are designated from top to bottom $X_1$, $X_2$, $X_3$ and $X_4$. The array also includes four column conductor lines, each connecting the column-oriented plates of a respective column of devices, and are designated from left to right $Y_1$, $Y_2$, $Y_3$ and $Y_4$. Conductive connections are made to lines through conductive landings or contact tabs 52 provided at each end of each of the lines. While in FIG. 2 the row conductor lines appear to cross the column conductor lines, the row conductor lines are insulated from the column lines by a layer 54 of transparent glass as is readily apparent in FIGS. 3, 4 and 5. In FIG. 2, the outline of the structure underlying the glass layer 54 is shown in solid outline for reasons of clarity.

The array includes a substrate or wafer 55 of semiconductor material having a high resistivity layer **55*a* epitaxially formed on a low resistivity base layer 55*b*. Layers 55*a* and 55*b* correspond to layers 11*a* and 11*b* of FIGS. 1A–1C. Insulating layer 56 overlies the layer 55*a* and contacts a major face of the substrate 55. A plurality of deep recesses 57 are provided in the insulating layer 56, each for a respective device 51. Accordingly, the insulating layer 56 includes a thick or ridge portion 58 surrounding a plurality of thin portions 59 in the bottom of the recesses. On the bottom or base of each recess are situated a pair of substantially identical conductive plates or conductive members 61 and 62 of rectangular outline. Plate 61 is denoted a row-oriented plate and plate 62 is denoted a column oriented plate. The plates 61 and 62 of a device 51 are spaced close to one another along the direction of a row and with adjacent edges substantially parallel. In proceeding from the left hand portion of the array to the right hand portion, the row-oriented plates 61 alternate in lateral position with respect to the column oriented plates 62. Accordingly, the row-oriented plates 61 of pairs of adjacent devices of a row are adjacent and are connected together by a conductor 63 formed integral with the formation of the plates 61. With such an arrangement a single connection 64 from a row conductor line through a hole 69 in the aforementioned glass layer 54 is made to the conductor 63 connecting a pair of row-oriented plates. The column-oriented conductor lines are formed integrally with the formation of the column-oriented plates 62. A P-type conductivity region 66 of high conductivity or low impedance is provided in the surface adjacent region of the substrate underlying the base of the recess 57. Regions 67 in the substrate are also of P-type conductivity and are formed concurrently with the formation of P-type regions 66 in accordance with the diffusion technique for the formation thereof in which the plates 61 and 62 and thick oxide 58 mask diffusion of P-type dopant into the substrate and set the lateral boundaries of the P-type diffusion regions which surround the carrier storage regions and are not part of the present invention. The glass layer 54 overlies the thick portion 58 and thin portion 59 of the insulating layer 56, the plates 61 and 62, conductors 63 and column-oriented conductor lines $Y_1$–$Y_4$ except for the contact tabs 52 thereof. The glass layer 54 may contain an acceptor activator and may be utilized as an acceptor diffusion source in the formation of the P-type region 66**.

Figures 3, 4, 5:
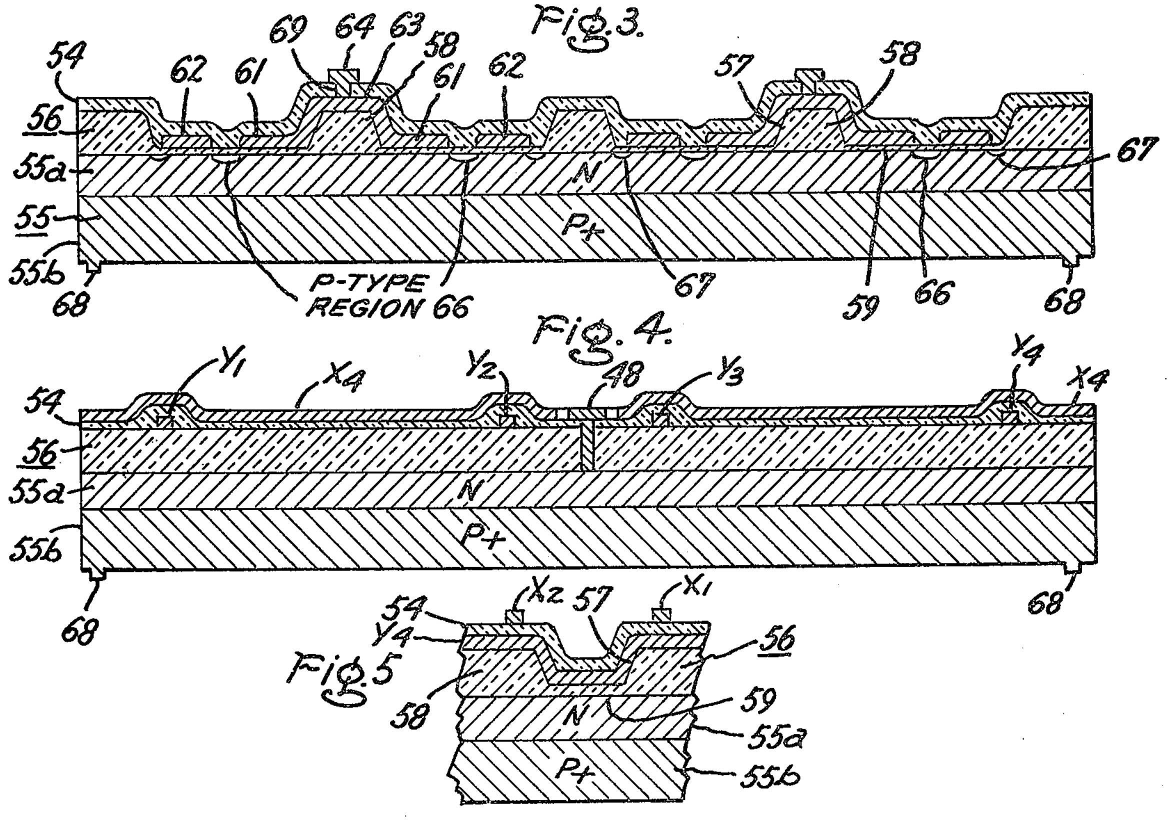
FIG. 3 is a sectional view of the assembly of FIG. 2 taken along section lines 3—3 of FIG. 2.
FIG. 4 is a sectional view of the assembly of FIG. 2 taken along section lines 4—4 thereof.
FIG. 5 is a sectional view of the assembly of FIG. 2 taken along section lines 5—5 thereof.

Terminal member 48 is connected through insulation layers 56 and 54 to the high resistivity layer **55*a* as shown in FIG. 4. A ring shaped electrode 68 is provided on the major surface of the substrate opposite the major surface on which the devices 51 were formed to contact layer 55*b*. Terminal member 48 connected to N-type layer 55*a* and ring shaped terminal member 68 connected to the P-type layer 55*b*** enable the PN junction formed therebetween to be reversely biased.

The image sensing array 50 and the devices 51 of which they are comprised may be fabricated using a variety of materials and in variety of sizes in accordance with established techniques for fabricating integrated circuits. One example of an array using specific materials and specific dimensions will be described. The substrate 55 is a base wafer of monocrystalline silicon of P-type conductivity having a resistivity of 0.01 ohm-cm (one mil is one-thousandth of an inch) and 10 mils thick on which a layer of N-type silicon is epitaxially deposited having a resistivity of 10 ohm-cm and 0.5 mil thick. The insulating layer is thermally grown silicon dioxide with the thin portions 59 of 0.1 micron (one micron is $10^{-6}$ meter) thereof underlying the plates separately grown after etching of an initially uniformly thick layer of 1 micron of thermally grown silicon dioxide to form the recesses 57 therein. The row-oriented rectangular plates 61 and the column-oriented plates 62 are made of vapor deposited molybdenum. The plates are 1.2 mils by 0.9 mils and adjacent edges are spaced apart by 0.2 mil. The connections 63 between adjacent row-oriented plates of adjacent devices of a row and the column conductor lines $Y_1$–$Y_4$ are also of molybdenum and are integrally formed with the formation of row-oriented plates 61 and column-oriented plates 62. The insulating layer 54 is a borosilicate glass which is vapor deposited over the plates 61 and 62 and the conductors thereof. As will be explained below the P-type region 66 in the substrate is formed by diffusion from the borosilicate glass layer 54 through the thin portion 59 of silicon oxide layer 56. The row-oriented conductor lines $X_1$–$X_4$ are constituted of vapor deposited aluminum overlying the insulating layer 54. Openings 69 in the insulating layer 54 over the conductors 63 interconnecting adjacent row-oriented plates 61 of adjacent devices of a row enable connections 64 to be made therethrough so that all the row-oriented plates of a row are connected to the row conductor line of that row.

Starting with the wafer 55 having an N-type layer **55*a* on a base layer 55*b* of P-type conductivity, a thick layer of field oxide 56 is thermally grown over the N-type layer. Recesses 57 extending to surface of the silicon wafer are formed in the oxide layer 56 using conventional photolithographic techniques and thereafter the thin portions 59 of the layer are thermally grown to the desired extent to form the bases of the recesses 57. A layer of molybdenum 0.4 micron thick is vapor deposited over the exposed portions of the insulating layer. The molybdenum layer is patterned using conventional photolithographic techniques to form the plates 61 and 62, the conductors 63**, and the column-oriented lines $Y_1$–$Y_4$. Next, a low temperature borosilicate glass is deposited over the wafer to form the insulating layer 54. The substrate 55 is heated to drive boron from the layer 54 through the thin portions 59 of layer 56 in the bases of the recesses 57 that are not masked by the molybdenum conductors and into the epitaxial layer 55*a* to form the P-type conductivity regions 66 and 67 therein. The insulating layer 54 is patterned with holes 69 extending to the conductors 63 and thereafter a layer of aluminum 1 micron thick is deposited by evaporation over the surface of the insulating layer 54. The layer of aluminum extends into the holes 69 and makes connection with the conductors 63. The layer of aluminum is patterned to provide the row-oriented conductor lines $X_1$–$X_4$.

Figure 6:
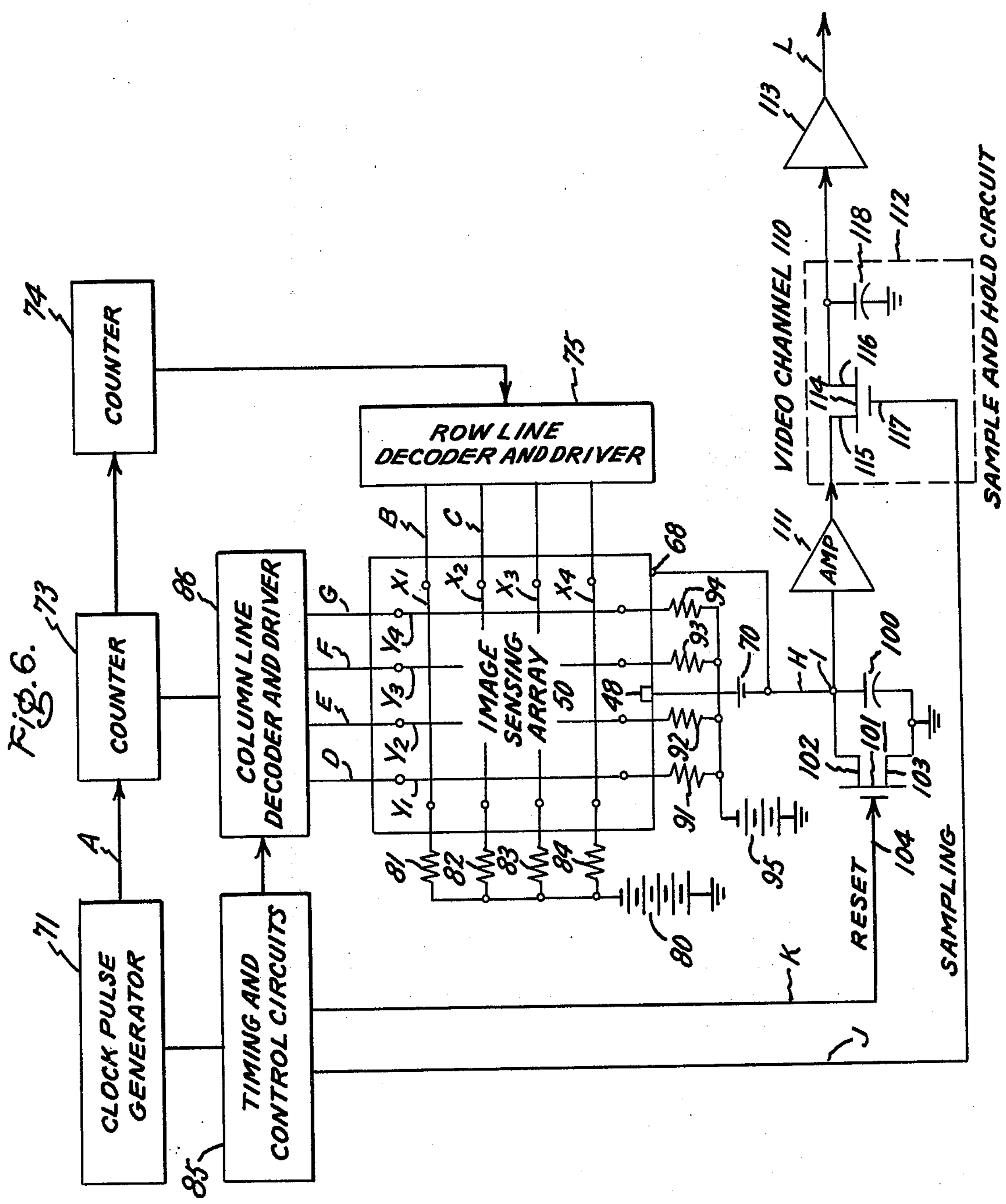
FIG. 6 is a block diagram of a system including the image sensing array of FIGS. 2–5.

Referring now to FIG. 6, there is shown a block diagram of a system including the image sensing array 50 of FIG. 2 to provide a video signal in response to radiation imaged on the array by a lens system (not shown), for example, The video signal may be applied to a suitable display device (not shown) such as a cathode ray tube as described in the above-referenced patent application Ser. No. 264,804 along with sweep voltages synchronized with the scanning of the array to convert the video signal into a visual display of the image.

The system will be described in connection with FIGS. 7A–7L which show diagrams of amplitude versus time drawn to a common time scale of signals occurring at various points in the system of FIG. 6. The point of occurrence of a signal of FIGS. 7A–7L is referenced in FIG. 6 by a literal designation corresponding to the literal designation of the figure reference. The amplitudes of the signals of FIGS. 7A–7L are not drawn to a common voltage or current scale for reasons of clarity in explaining the operation of the system.

Figure 7A:
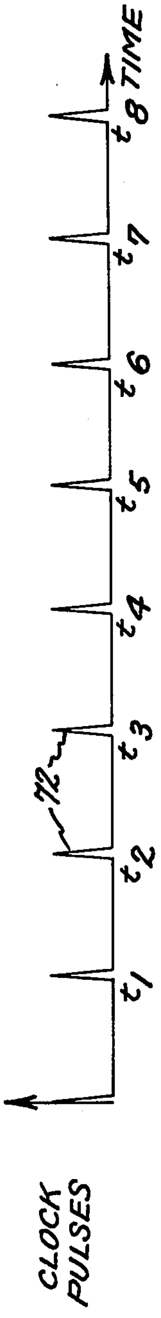
FIGS. 7A through 7L are diagrams of amplitude versus time drawn to a common time scale of signals occurring at various points in the assembly of FIG. 6. The point of occurrence of a signal of FIGS. 7A–7L in the block diagram of FIG. 6 is identified in FIG. 6 by a literal designation corresponding to the literal designation of the figure.

The system includes a clock pulse generator 71 which develops a series of regularly occurring Y-axis pulses 72 of short duration utilized for timing the image sensing system. The output of the pulse generator 71 is shown in FIG. 7A which depicts pulses 72 occurring in sequence at instants of time $t_1$–$t_8$ and representing a half scanning cycle of operation of the array. The output of the clock pulse generator is applied to a first counter 73 which divides the count of the clock pulse generator by four. The output of the first counter 73 is also applied to a second counter 74 which further divides the count applied to it by four.

Figure 7B:
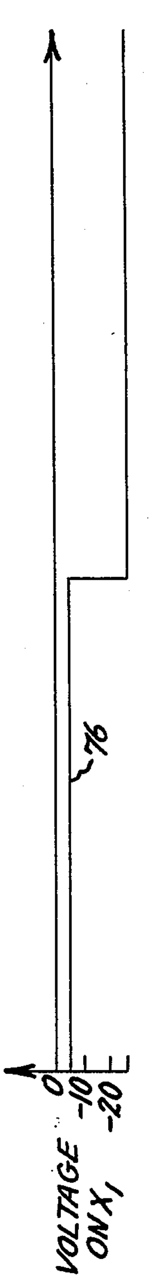
Figure 7C:
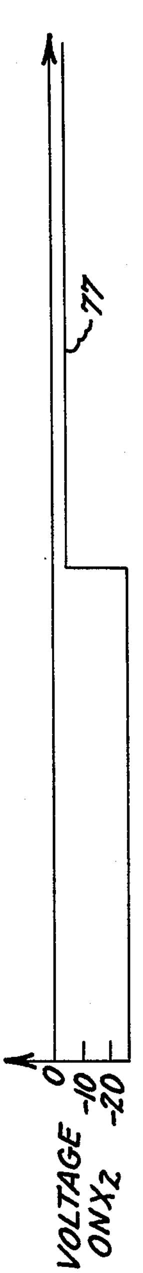
Figure 7D:
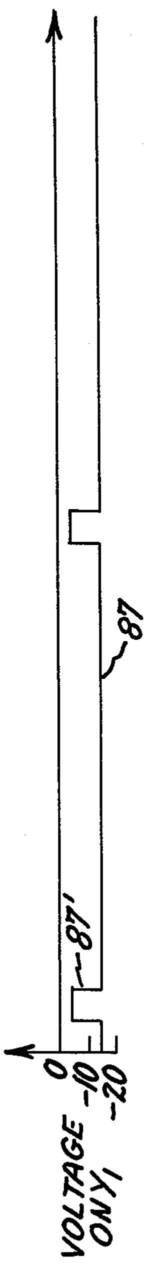
Figure 7E:
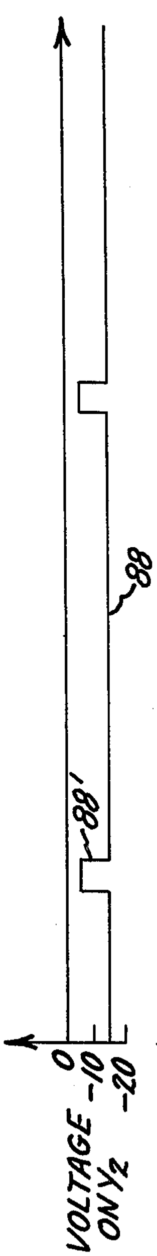
Figure 7F:
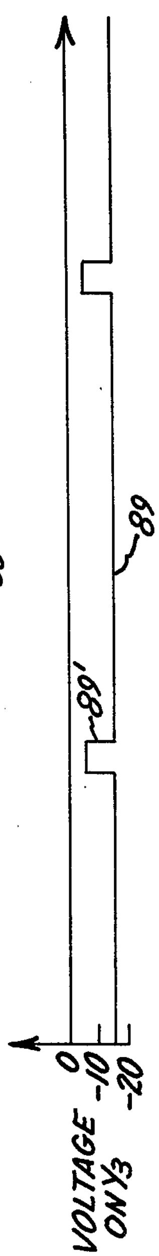
Figure 7G:
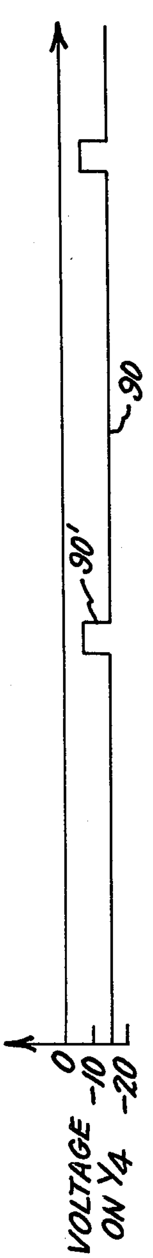

The output of the second counter 74 is applied to the row line decoder and driver 74 which develops four outputs during a cycle of operation, each of which is applied to a respective one of row conductor lines $X_1$–$X_4$ of the array, only the first and second outputs of which are shown in the graphs of FIGS. 7B and 7C. The first output 76 shown in FIG. 7B is applied to row conductor line $X_1$ and the second output 77 shown in FIG. 7C is applied to row conductor line $X_2$. The first output rises from −25 volts to −5 volts where it remains until time $t_4$ when it drops to −25 volts where it remains during the remainder of the cycle. At time $t_4$ the second output rises from −25 volts to −5 volts where it remains until time $t_8$ after which it drops to −5 volts and remains there for the duration of the cycle of scan. Similarly, at time $t_8$ the third output (not shown) rises from −25 volts where it remains until time of occurrence of the twelfth pulse of the clock generator when it drops to −25 volts where it remains. Finally, during the time between the twelfth and sixteenth pulses from the clock generator the fourth output (not shown) has a value of −5 volts and has a value of −25 during the remainder of the cycle of scan. As each of the lines $X_1$–$X_4$ is connected through a respective one of isolating resistor 81-84 to a −25 v potential point with respect to ground provided by source 80, the outputs applied thereto from the row line decoder and driver 125 causes a rise in potential on each of the lines $X_1$–$X_4$ in sequence from −25 volts to −5 volts. Raising of the potential of a row conductor line raises the potential of the row-oriented plates 61 of the devices 51 connected thereto and enables read out of the devices by application of readout potentials to column-oriented plates 62 in turn.

The output of the clock pulse generator 71 is also applied to the timing and control circuits block 85 which provides a plurality of outputs for the system. The column line decoder and driver 86 receives an input from the timing and control circuits block 85 and inputs from the first counter 73 to provide four outputs shown respectively in FIGS. 7D–7G each corresponding to a respective one of clock pulses occurring at instants $t_1$–$t_4$. Each of the outputs 87–90 having respective pulse portions 87′–90′ is applied to a respective one of column conductor lines $Y_1$–$Y_4$. Each of the outputs rise from a −15 volt level to a −5 volt level where it remains for an interval of time and thereafter returns to the −15 volt level. As each of the lines $Y_1$–$Y_4$ is connected through a respective one of isolating resistors 91–94 to a −15 volt potential point with respect to ground provided by source 95, the outputs applied thereto from the column line decoder and driver 86 causes a rise in potential on each of the lines $Y_1$–$Y_4$ in sequence from −15 volts to −5 volts. Raising of the potential of a column conductor line raises the potential of the column-oriented plates 62 of the devices 52 connected thereto and accordingly minority carriers stored in the devices in the row selected for read out are injected into the substrate of the array.

In accordance with the present invention, the P-type layers 55*b* spaced close to the column connected cells of the array and reversely biased by source 70 connected between terminals 48 and 68 rapidly collects the injected carriers which diffuse to the depletion region associated therewith. In place of the battery 70, a capacitor (in addition to inherent depletion capacitance of the wafer 55) may be used to maintain bias voltage during operation. This capacitor could be recharged during reset interval time to the bias voltage, i.e. when reset switch 101 is closed. Rapid removal of the injected carriers allows each of the column conductor lines to be returned to storage potential with a shorter time delay than would otherwise by required to allow the injected carriers to disappear from the regions of storage.

Figures 7H, 7I, 7J, 7K, 7L:
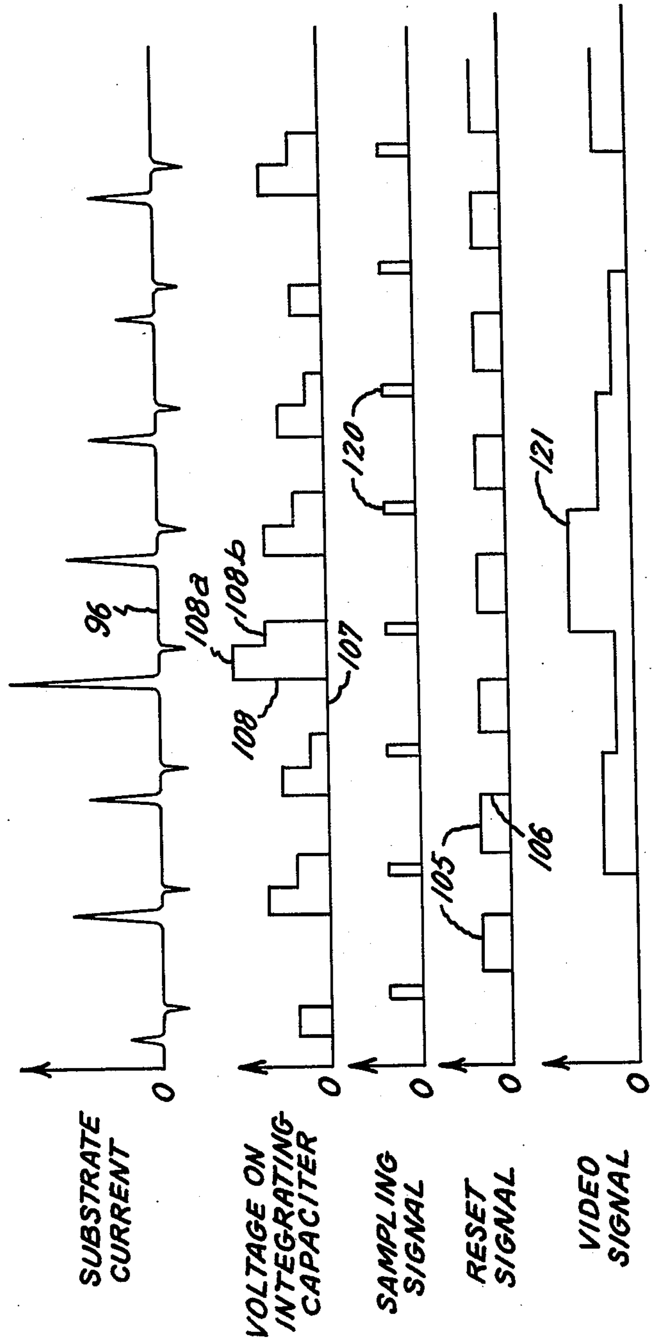

The current flow to substrate contact 68 in response to a sequential scanning of the devices in the first and second rows of the array is depicted in the graph 96 of FIG. 7H. In this figure are shown eight pairs of current pulses corresponding respectively to the current flow in circuit with the substrate during the read out of the devices of the first and second rows in sequence. The first occurring pulse of each pair corresponds to current flow corresponding to read out of radiation produced charge and to some of the depletion producing charge stored at the instant of application of storage potential to the column-oriented plate 62 of the device. The second occurring pulse of opposite polarity to the first occurring pulse corresponds to the aforementioned current flow resulting from the application of voltage to the column-oriented plate 62 of the device. The first pulse of each pair occurs at the leading edge of a respective one of column drive pulse 87′–90′ and the second pulse of each pair occurs at the trailing edge of a respective one of drive pulses 87′–90′. The first pulses are shown of various amplitudes corresponding to various magnitudes of charge stored in the various devices of the first two rows. The amplitudes of the second pulses are identical as the column-oriented cells of each of the devices are identically constituted and hence would take identical charging or depletion region producing current. The important consideration in this connection is not variation in such charging currents among the cells but rather the difference in the charge flow into the substrate to establish the initial depletion and the charge which flows back out on injection of stored charge into the substrate. Integration of the first and second pulses of each pair of pulses is provided by charging a capacitor, for example, the voltage across the capacitor represents the charge stored in the sensing device 51 in the first row and the first column. Such a function is provided by capacitor 100 connected between the substrate contact 98 and ground. The capacitor 100 represents essentially the capacitances of the substrate 55 of the array 50 in relation to the plates of the devices 51, and includes stray capacitance such as capacitance of the array lead lines and contact tabs and may also include added capacitance, if desired. An N-channel field effect transistor 101 is provided having its source 103 to drain 102 circuit connected in shunt with the capacitor 100 and its gate 104 connected to the timing and control block 85 which provides reset pulses 105 as shown in FIG. 7K. The reset pulses 105 switch from a ground to a positive voltage level. The trailing edge 106 of each reset pulse is coincident with the leading edge of a respective one of column line drive pulses 87′–90′. Accordingly, except during the read out interval for each device 51 the capacitor 100 is shorted or bypassed to ground. On occurrence of a column drive pulse, a pair of current pulses as mentioned above are produced which are integrated by the capacitor 100 and result in a corresponding two level output pulse, the first level corresponding to the charge of the first current pulse and the second level corresponding to the charge of the first current pulse less the charge of the second current pulse. The output across the capacitor is shown in graph 107 of FIG. 7I in which each of the two leveled pulses 108 having a first level **108*a* and a second level 108*b* correspond respectively to a respective pair of pulses of FIG. 7H. In the case of the first pulse and seventh pulse of graph 107, the second level is zero indicating that no radiation produced charge had been stored in the devices corresponding thereto. As the same capacitor 100 and the same switch, transistor 101**, is used in the read out of charge stored in each of the devices, the array is ungrounded many times during the storage cycle of a device. As signal voltage amplitude is small in relation to storage potentials utilized on the plates of the devices such action does not affect the storage in the devices not undergoing read out.

The output appearing across the integrating capacitor 100 is applied to a video channel 110 comprising a first amplifier 111, a sample and hold circuit 112 and a second amplifier 113, the output of which may be applied to a cathode ray tube display device (not shown). The sample and hold circuit 112 includes an N-channel MOSFET transistor 114 having a drain 115, a source 116 and a gate 117 and a capacitor 118. The source to drain current flow path of the transistor 114 is connected between the output of the amplifier 111 and one electrode of the capacitor 118, the other electrode of which is connected to ground. The gate 117 is connected to the timing and control circuits block 85 which provides a train of sampling pulses 120 such as shown in the graph FIG. 7J. Each of the pulses 120 are of short duration and are equally spaced along the time axis of the graph. One sampling pulse 120 occurs for every clock pulse 72. Each of the pulses are phased to occur during the occurrence of the back porch or second level **108*b* of the two level video pulses 108 of FIG. 7I appearing on the integrating capacitor 100. During the sampling intervals the transistor 114 is turned on so as to permit the second capacitor 118 to charge in turn to a voltage corresponding to the voltage of the second levels 108*b* of the pulses 108 of FIG. 7I. Accordingly, a video signal 121 such as shown in FIG. 7L is provided in which the signal shifts from one video level to another at the sampling interval in accordance with the voltage on the integrating capacitor 100** during the sampling interval.

While in the embodiments of FIGS. 1A–1C and FIG. 6, a bias battery is shown reversing biasing the P-type layer **11*b* with respect to the N-type layer 11*a*, an ohmic connection between layers 11*b* and 11*a* would also be able to establish a depletion region at the junction thereof to collect the injected carriers. Also, a metallic layer may be used in place of the P-layer 11*b* to form a Schottky barrier for establishing the depletion region 28**.

While the invention has been described in connection with arrays of sixteen devices, it is readily apparent that the invention is particularly applicable to arrays including a much larger number of devices. Also, the devices of the array may be organized in arrangements other than shown.

While in the illustrative embodiments described, the semiconductor substrate is constituted of silicon semiconductor material other semiconductor materials such as germanium and Group III-Group V compounds, such as gallium phosphide, could be used. Also, while in the illustrative embodiments described the insulating member was constituted of silicon dioxide, other insulating materials such as silicon nitride, silicon oxynitride, and aluminum oxide would be suitable. Also, the conductive plates could be constituted of any of a number of conductive materials, metallic and non-metallic.

While the substrate of the array has been described as constituted of a layer of N-type conductivity semiconductor material on a layer of P-type semiconductivity material, a layer of P-type conductivity semiconductor material on a layer of N-type semiconductivity material could as well be used. Also, in such a case the applied potentials would be reversed in polarity and the current flows would be reversed in direction.

The devices and array described are particularly adapted for front face illumination. Preferably the conductive plates are transparent to provide high efficiency and sensitivity. Transparency in the conductive plates may be obtained by use of transparent metal layers or transparent high conductivity semiconductor materials, such as heavily doped silicon, or other materials which are both conductive and transparent.

While the invention has been described in specific embodiments, it will be appreciated that modifications, such as those described above, may be made by those skilled in the art and it is intended by the appended claims to cover all such modifications and changes as fall within the true spirit and scope of the invention.

What we claim as new and desire to secure by Letters Patent of the United States is:

1. A radiation sensing device comprising
a substrate of semiconductor material of one conductivity type having a major surface,
a first conducting member overlying a first portion of a region of said substrate adjacent said major surface and in insulating relationship therewith,
a second conducting member overlying a second portion of said surface adjacent region of said substrate and in insulating relationship therewith,
means for coupling said first and second portions of said surface adjacent region,
a first voltage means for providing a first voltage between said first conducting member and said substrate to deplete said first portion of majority charge carriers,
a second voltage means for providing a second voltage between said second conducting member and said substrate to deplete said second portion of majority charge carriers,
means for exposing said substrate to radiation whereby minority carriers generated in said portions are stored therein,
means for collapsing said first voltage to cause charge stored in said first portion to flow into said second portion,
means for collapsing said second voltage whereby charge stored in said second portion is injected into said substrate, capacitive means in series circuit with the capacitor formed by said second conducting member and said substrate for integrating a first displacement current flow in said series circuit in response to the collapsing of said second voltage thereon,
a region of opposite conductivity type in said substrate spaced from and adjacent to both of said portions of said surface adjacent region of one conductivity type,
means for conductively connecting said region of opposite conductivity type to said substrate to deplete mobile carriers from the vicinity of the PN junction formed between said region of opposite conductivity and said substrate,
whereby minority charge carriers injected into the substrate are substantially collected and removed from said substrate without substantially altering the charge on said capacitive means,
means for reestablishing said second voltage on said second conducting member whereby a second displacement current flows in said series circuit in response to the reestablishment of said second voltage, the time integrated first and second displacement current flows in said capacitive means constituting a measure of said stored charge.

2. The device of claim 1 in which said connecting means is an ohmic connection between said region of opposite conductivity type and said substrate.

3. The device of claim 1 in which said connecting means is a source of voltage for reversely biasing said PN junction.

4. The device of claim 1 in which said substrate of one conductivity type has high resistivity and said region of opposite conductivity type has low resistivity.

5. The device of claim 1 in which said substrate of one conductivity type is of N-type conductivity and said region of opposite conductivity type is P-type.

* * * * *